Feb. 2, 1965     L. E. PALMER     3,168,613
INSULATED WIRING BOX MADE OF SELECTIVELY USEABLE MOLDED
SECTIONS OF THERMOPLASTIC MATERIAL UNITED BY
SOLVENT WELDING TO FORM A UNITARY BOX

Filed May 8, 1963     2 Sheets-Sheet 1

INVENTOR
Lewis E. Palmer

BY *J. D. Grieshauer*
ATTORNEY

Feb. 2, 1965 L. E. PALMER 3,168,613
INSULATED WIRING BOX MADE OF SELECTIVELY USEABLE MOLDED
SECTIONS OF THERMOPLASTIC MATERIAL UNITED BY
SOLVENT WELDING TO FORM A UNITARY BOX
Filed May 8, 1963 2 Sheets-Sheet 2
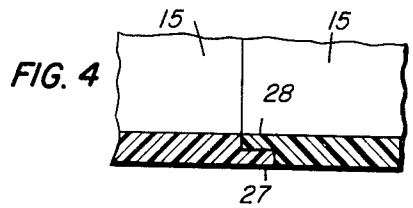
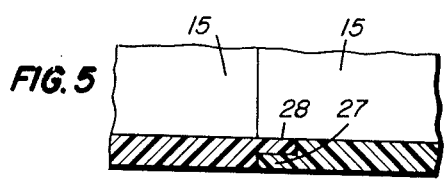
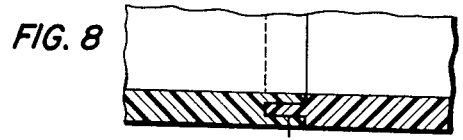
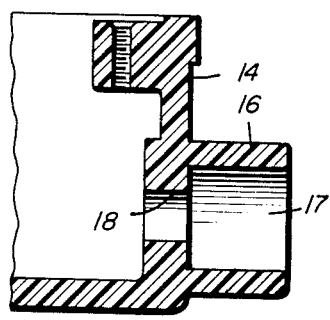
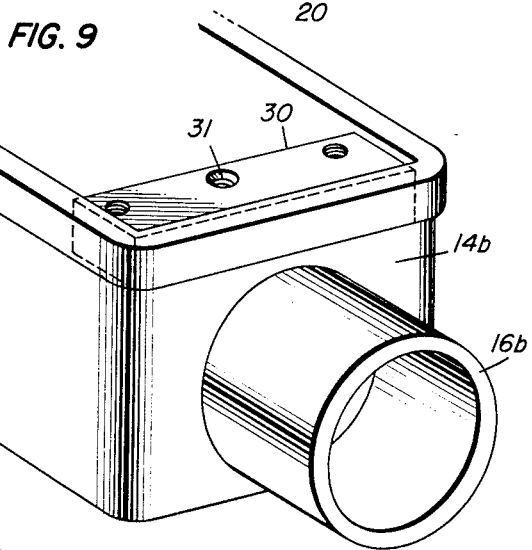
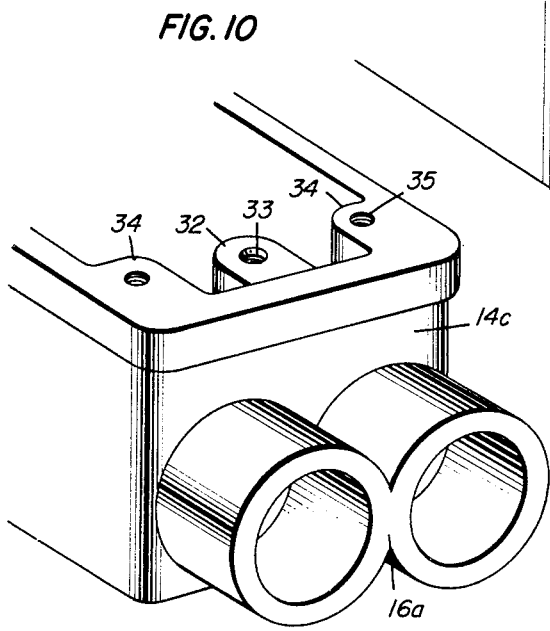
INVENTOR
Lewis E. Palmer
BY
ATTORNEY

United States Patent Office 3,168,613
Patented Feb. 2, 1965

3,168,613
INSULATED WIRING BOX MADE OF SELECTIVE-
LY USEABLE MOLDED SECTIONS OF THERMO-
PLASTIC MATERIAL UNITED BY SOLVENT
WELDING TO FORM A UNITARY BOX
Lewis E. Palmer, Washington, W. Va., assignor to Union
Insulating Company, Parkersburg, W. Va., a corporation of West Virginia
Filed May 8, 1963, Ser. No. 278,943
2 Claims. (Cl. 174—65)

This invention relates generally to electrical wiring devices such as outlet and junction boxes made of insulating plastic materials and more particularly to boxes molded of thermoplastic material such as polyvinyl chloride rather than thermosetting materials like the phenolics and other basic resins. The invention further relates to such sectional wiring boxes that in the past have been made up of selectable metal sections which are separably fastened together to make up a box having the desired number, sizes and locations of knockouts or conduit receiving openings to meet particular wiring needs.

For many years insulated outlet and junction boxes molded of the thermosetting plastic materials have been extensively used in concealed wiring of dwellings and other buildings, the boxes being set within walls and other portions of the structure of the building. To a lesser extent such molded insulated boxes have been used in surface wiring, particularly in industrial and commercial buildings. The boxes are adapted to be mounted on wall surfaces and structural members of a building. They are heavier and stronger than boxes made for use within the building structure where the box is protected from damage. Surface mounted boxes of this type are frequently molded with bosses or tubular sockets for the reception of insulated rigid conduits or pipes that contain the electrical conductors or cables which enter the box; whereas the thinner walled boxes used with concealed wiring usually have knockouts for the entrance of the conductors.

In both metal and insulated boxes of this type, not only do the number and location of the conduit openings or bosses vary but the sizes of the latter also vary. The rigid conduits may have trade sizes of ½″, ¾″ or 1″ or more depending upon the size and the number of conductors. It is therefore necessary to provide a large variety of boxes to meet the many different wiring requirements. These boxes may have anywhere from one to four entrance bosses for conduits of one or more of the above stated diameters. If that part of the box containing the bosses is molded in one piece, the manufacturer must have very many molds and tools for making a line of boxes which have provisions for the many different combinations of numbers, sizes and locations of conduit receiving bosses which are necessary to satisfy the requirements encountered in different types of installations.

The problems of both the production and the inventory of such a line of boxes are great, and my invention seeks to overcome them and to effect a considerable saving by molding only a limited number of specifically different box sections and selectively uniting any two of the sections by solvent welding them together to form a unitary box, the different box sections having conduit receiving sockets varying in numbers, sizes and locations. Thus the complementary box sections may be assembled in any desirable combination to economically produce boxes which are similar but have provisions for different sizes and numbers of conduit openings. Hence a large number of different boxes may be made by the use of only a limited number of molding tools.

Another object is to provide such a sectional box of rectangular shape which is made up of two similar complementary parts or sections that have their bottom and upright side walls fitted together in a novel manner and integrally united by a solvent of the polyvinyl chloride or other thermoplastic moldable insulating material. Such boxes will have at either or both ends provisions for the attachment of the desired number and sizes of conduits that are needed.

Another object is to provide a sectional box of the above indicated character in which the complementary parts or sections may be molded in the most simple form of molding apparatus, wherein the two die parts have relative movement in a straight line, thus permitting the molding of the sections not only with the projecting tubular hubs or bosses but also with projecting ledges on the inside of the box, without the need for the mold to have any laterally movable or retractable die parts.

With the above and other objects and advantages in view, the invention resides in the novel combinations and arrangements of parts and the novel features of construction hereinafter described and claimed, and illustrated in the accompanying drawings which show the present preferred embodiments of the invention.

Figure 2:
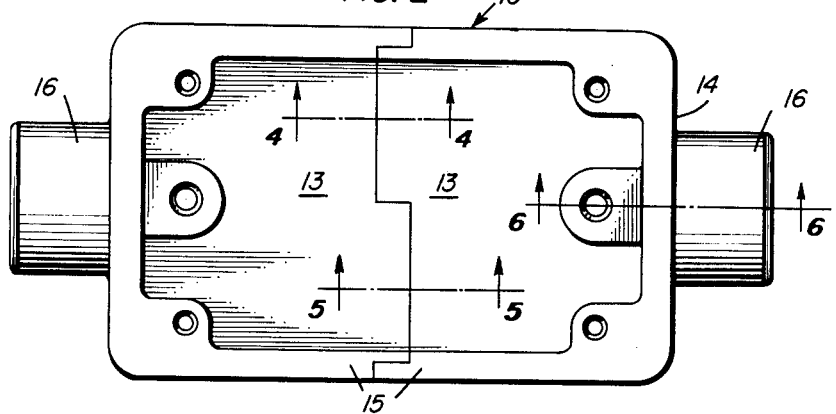
FIG. 2 is a top or outer face view of the box showing the two sections in FIG. 1 assembled but not welded together.

FIGS. 4 and 5 are detail sections taken on the lines 4—4 and 5—5 respectively in FIG. 2;

FIG. 6 is a detail section on line 6—6 in FIG. 2;

FIGS. 7 and 8 are detail sections similar to FIGS. 4 and 5 but showing other possible forms for the mating edges of the two box sections; and FIGS. 9 and 10 are perspective views of the end portions of two different box sections showing possible arrangements of sockets or bosses forming the conduit receiving openings, and possible forms of internal ledges for the support and attachment of covers, switches, outlet receptacles or the like to the box by means of screws.

Referring more in detail to the drawings, in which FIGS. 1 through 5 shows the present preferred embodiment of the invention, the number 10 denotes the box as a whole. The box is shown as of elongated rectangular shape with an open front or outer face that may be closed by a removable cover or in which may be mounted a switch, an outlet receptacle or any similar electrical device. The box is made up of two independently molded sections 11 and 12 with complementary abutted or mated edge portion which are permanently united to form a unitary box. The two parts or sections are preferably molded from a thermoplastic insulating material and the mating edges are cemented or welded together preferably by a suitable solvent of the thermoplastic molding compound. The solvent when applied to the contacting surfaces of the mating edges of the two box sections, will dissolve the PVC material and make such surfaces liquid so that when the two sections are pressed together and the solvent evaporates, the sections will be bonded together in very much the same way that two pieces of steel are welded by heat. I have therefore used the term "solvent welding" to distinguish from uniting two sections by a glue or an adhesive cement which would have to be used if the sections are molded of a thermosetting material.

Figure 1:
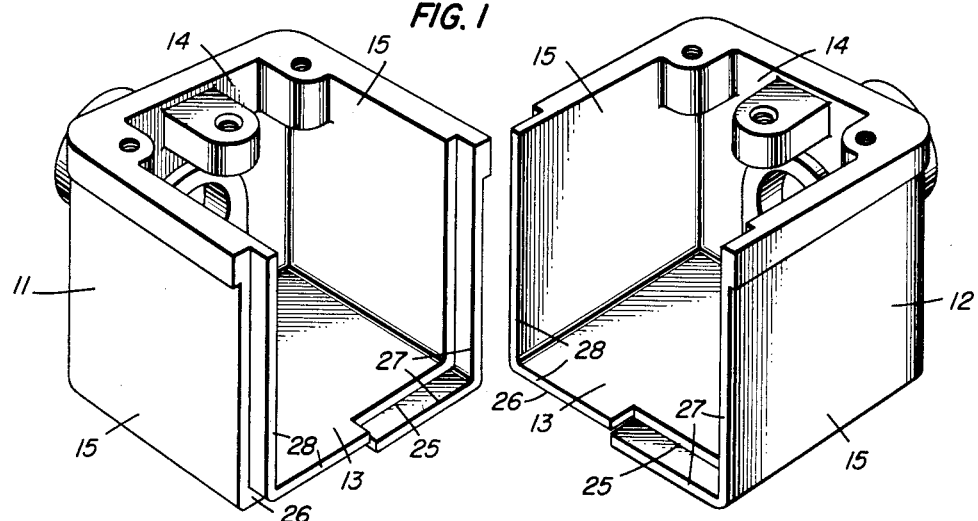
FIG. 1 is a perspective view of two box sections about to be interfitted or assembled and then solvent welded together to form a unitary box.

As shown in FIG. 1 each of the box sections 11 and 12 has a generally rectangular bottom wall 13 from three sides of which projects an upright marginal wall that includes an end wall portion 14 and parallel side wall portions 15. The free edges of the bottom walls and the upright edges of the opposed side walls of the two sections are respectively formed with complementary overlapping or mating portions that are to be solvent welded together. The conductor entrances are formed on the end walls 14 and are preferably in the form of socketed hubs or bosses 16 which project endwise of the box, so that the sections 11 and 12 may be molded in the most simple form of molding apparatus as previously stated. The tubular bosses 16 preferably project outwardly from the end walls 14 and have cylindrical bores 17 of a diameter to receive a conduit of the desired size. While the rigid conduits may be fastened in the bosses by screw threads on the associated parts, they are preferably fastened by a cement that is solvent of the thermoplastic material. In order to facilitate the positioning of the conduits in the sockets or bosses 16, the latter have at their inner ends inwardly projecting annular flanges to provide stop shoulders 18 as shown in FIG. 6.

Figure 3:
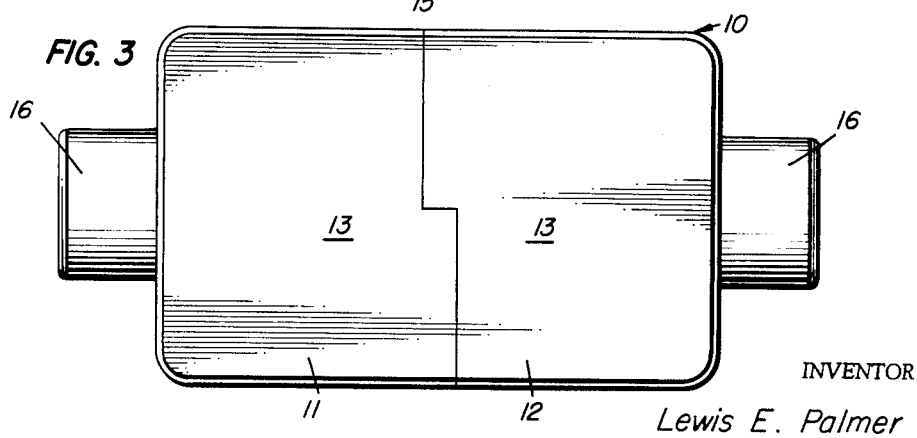
FIG. 3 is a bottom view of the box shown in FIG. 2.

The body portions of outlet and junction boxes of this type are usually about 4½" long, 2¾" wide and 2" deep, but the conduit entrance bosses on them vary as previously indicated. For example if a single conduit is to enter the box, there will be a single inlet boss 16 of the proper diameter at one end of the box and the other end will be without a boss. If two conduits are to be used with the box, there may be one boss at each end as shown in FIGS. 1–3, or two bosses at one end as shown at 16ª in FIG. 10. The single boss 16ᵇ shown in FIG. 9 is of larger diameter than the bosses shown in FIGS. 1–3. Because of the many different boxes that may be needed, I propose to make a limited number of the box sections 11 and 12, one with no boss and others with different numbers and sizes of bosses so that by selecting two of the several box sections and uniting them, a unitary box having the desired number and sizes of bosses will result.

While the end wall portions of the several different box sections will vary, the mating edges of all of the sections will be the same. The line of the mating edges between the sections 11 and 12 extends transversely of the longitudinal axis of the box and is preferably but not necessarily located midway between the end walls 14. What is important is that the effective mid-points of all joints be at the center of the box so that the various sections for the same size box may be mated. As shown the joint is centrally located and extends at an angle of 90° to the longitudinal axis of the box but it may extend at various other angles. To get additional strength at the welded joints it is desirable to have a large surface of contact at the mating edges of the bottom and side walls 13 and 15 of the two sections. The joint is therefore a scarf or lapped joint such as shown in FIGS. 4 and 5, but the contacting edges may be beveled as shown at 19 in FIG. 7, or may be tongue and grooved as shown at 20 in FIG. 8, or of other form so long as the contacting edge portions of the walls of the two sections are complementary.

Preferably the lapped joint is made in such a way, that the overlapping portions of the walls 13 and 15 have a telescopic fit or slidable engagement in the direction of the longitudinal axis of the box so that when the two box sections are engaged, the contacting overlapping surfaces will prevent any relative lateral shifting of the two sections either horizontally or sidewise of the box or vertically with respect to the bottom of the box. Hence the solvent bonding of the mating edges of the box sections need only prevent the two sections from separating in an endwise direction. Such a lapped joint may be formed, as shown in FIGS. 1–5, by forming on the inside of each section a recess 25 which extends along the free edge of one side wall 15 and halfway across the bottom wall 13, and by forming on the outside of each section a similar recess 26 which extends along the free edge of the other side wall 15 and halfway across the bottom wall 13. The formation of the recess 25 leaves a right angular outer flange 27 which extends halfway around the box section and is adapted to seat in the recess 26 of the complementary box section; and the formation of the recess 26 leaves a similar right angular inner flange 28 which extends halfway around the box section and is adapted to seat in the recess 25 of the other or complementary box section. The recesses 25 and 26 have the same dimensions and preferably have a width of one-half of the thickness of the walls and a depth of about ¼" for a box of the above stated dimensions.

With such location and arrangement of the recesses and flanges, as shown in FIGS. 1–3, if a plane is passed through the long axis of the box perpendicular to its bottom, it will be noted that on one side of the plane all outer surfaces of the joining edge pass the middle of the box, while all inner surfaces of the joining edge do not come to the middle, while on the opposite side of the plane, the opposite is true. Obviously the line of joining need not be at the middle of the box. It is also obvious that the two sides of the line of joining could each be moved an equal distance from the center line, and they would still mate. This construction of the contacting edges of the two box sections permits them to be readily assembled by relatively sliding movement in an endwise direction, provides ample welding surfaces and interlocks the two sections against lateral shifting either vertically in an up and down direction or horizontally in a transverse or sidewise direction.

By using the above described mating joint between the box sections and by making the tubular bosses on the end walls of the sections, the several box sections may be made in a simple mold that opens in a direction parallel to the open front face of the finished box. With this manner of molding the box sections it is also possible to mold on the inner sides of the end wall 14 near its top or outer rim, laterally projecting extensions or enlargements for the attachment of the box cover or the electrical device by means of screws; and that may be done without the necessity of carrying the enlargements or thicker sections down to the bottom wall. FIGS. 9 and 10 show two possible ways in which these extensions or enlargements may be formed. In FIG. 9 there is a shelf or ledge 30 on which may be supported the end of a mounting strap or a switch or other device. This rectangular ledge or extension 30 projects inwardly from the end wall 14ᵇ and extends entirely across the box, its upper face being spaced slightly below the plane of the rim of the box. At its center may be formed a hole 31 to receive one of the two screws that fasten the electrical device. In FIG. 10 there is shown on the end wall 14ᶜ a centrally positioned inwardly projecting enlargement or ear 32 adapted to support one end of the mounting strap of an electrical device and it is provided with a hole 33 for a fastening screw. Also in FIG. 10, there are at the two corners of the box section enlargements or ears 34 formed with holes 35 to receive two of the four screws used to fasten a cover on the box. These ears 34 project inwardly from the end wall 14ᶜ at its juncture with the side walls. If the box section is made in a mold having only two die parts, the holes 31 and 35 must of course be drilled after box sections have been molded, but these holes may be molded in it if the mold has retractable molding pins for forming them.

If desired the bosses 16 may be provided with knockouts such as commonly used on insulated wiring boxes; and also if desired fastening screw receiving holes may be formed in the bottom wall 13 of the box but preferably the box is supported by the rigid conduits that are cemented in the bosses.

While the electrician who installs the box may on the job select and unite two of the different box sections to produce a box having the desired sizes and numbers of bosses, that will usually be done by the manufacturer. It will be apparent that the invention will effect a considerable saving in both manufacture and inventory since by molding relatively few box sections equipped with a variety of different bosses, it is possible to produce a very large line of different boxes.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. An insulated open-topped electrical wiring box of generally rectangular configuration, comprising a pair of complementary sections each of which is formed of a thermoplastic material and includes a bottom wall, an end wall containing at least one means adapted for connection with an electric conductor, and a pair of opposed side walls connected at one end with said end wall, each of said sections being provided, at its open end and on one side of the central plane perpendicular to the bottom wall, with a right-angled extension including first and second portions extending longitudinally of said section from one of said side walls and the adjacent portion of said bottom wall, respectively, the right-angled extension of each of said sections extending into a corresponding right-angled recess contained in the free extremity of one side wall and the adjacent portion of the bottom wall of the other section, the surfaces of said right-angled extensions being permanently bonded to the walls of the recesses received thereby, whereby said sections are rigidly connected to form said open-topped electrical wiring box.

2. An insulated open-topped electrical wiring box of generally rectangular configuration, comprising a pair of complementary sections each of which is formed of a thermoplastic material and includes a bottom wall, an end wall containing at least one means adapted for connection with an electrical conductor, and a pair of side walls connected at one end with said end wall, each of said sections including means integral with said end walls between said side walls adapted for connection with the mounting strap of a switch, each of said sections being also provided, at its open end and on one side of the central plane perpendicular to the bottom wall, with a right-angled extension including first and second portions extending longitudinally of said section from one of said side walls and the adjacent portion of said bottom wall, respectively, the right-angled extension of each of said sections extending into a corresponding right-angled cut-out portion contained in the free extremity of one side wall and the adjacent portion of the bottom wall of the other section, the surfaces of said right-angled extensions being permanently bonded to the walls of the recesses received thereby, whereby said sections are rigidly connected to form said open-topped electrical wiring box.

References Cited by the Examiner

UNITED STATES PATENTS

| | | | |
|---|---|---|---|
| 1,650,233 | 11/27 | Plunkett | 220—3.94 |
| 2,357,755 | 9/44 | Moll | 220—3.94 |
| 2,500,053 | 3/50 | Andrews | 156—308 X |
| 2,764,308 | 9/56 | Hoch | 200—4 |
| 2,899,348 | 8/59 | Sweet et al. | 156—308 |
| 2,959,633 | 11/60 | Palmer et al. | 174—50 |
| 2,991,327 | 7/61 | Beliek | 174—53 |
| 2,999,611 | 9/61 | Paulson | 220—4 |
| 3,033,913 | 5/62 | Dietze | 174—50 X |

FOREIGN PATENTS

| | | |
|---|---|---|
| 106,990 | 3/39 | Australia. |
| 1,042,065 | 10/58 | Germany. |

OTHER REFERENCES

IBM, vol. 5, No. 1, June 1962, page 8.

Riley, M.W.: "Joining and Fastening Plastics," Materials in Design Engineering (magazine), Manual No. 145. January 1958.

C.O. Curme et al.: "Resinous Derivatives of Vinyl Alcohol," Industrial & Engineering Chemicals, October 1936, pp. 1123–1129, vol. 28, No. 10.

LARAMIE E. ASKIN, *Primary Examiner.*

JOHN P. WILDMAN, *Examiner.*